(12) United States Patent
Yanke et al.

(10) Patent No.: US 8,157,629 B2
(45) Date of Patent: Apr. 17, 2012

(54) CONCAVE SUSPENSION FOR A THRESHING SECTION IN A HARVESTING MACHINE

(75) Inventors: Bradley K. Yanke, Bettendorf, IA (US); Dan Burke, Cordova, IL (US)

(73) Assignee: Deere & Company, Moline, IL (US)

( * ) Notice: Subject to any disclaimer, the term of this patent is extended or adjusted under 35 U.S.C. 154(b) by 511 days.

(21) Appl. No.: 12/048,321

(22) Filed: Mar. 14, 2008

(65) Prior Publication Data

US 2009/0233663 A1 Sep. 17, 2009

(51) Int. Cl.
*A01F 12/28* (2006.01)

(52) U.S. Cl. ........................................ 460/109

(58) Field of Classification Search ............... 460/59, 460/79, 107–109, 62, 72, 71, 110; 209/270, 209/284–300; 241/286
See application file for complete search history.

(56) References Cited

U.S. PATENT DOCUMENTS

| | | | | |
|---|---|---|---|---|
| 3,156,245 A | * | 11/1964 | Hobbs | 460/141 |
| 3,552,396 A | * | 1/1971 | Gerhardt et al. | 460/1 |
| 3,974,837 A | * | 8/1976 | Applegate | 460/105 |
| 4,075,823 A | * | 2/1978 | Rowland-Hill | 56/14.6 |
| 4,330,000 A | * | 5/1982 | Peiler | 460/109 |
| 6,358,142 B1 | * | 3/2002 | Imel et al. | 460/109 |
| 6,802,771 B2 | * | 10/2004 | Schwersmann et al. | 460/69 |
| 7,001,267 B2 | * | 2/2006 | Behnke et al. | 460/6 |
| 7,059,961 B2 | * | 6/2006 | Schenk | 460/109 |
| 7,452,267 B2 | * | 11/2008 | Bundy et al. | 460/6 |
| 2002/0107625 A1 | * | 8/2002 | Beck et al. | 701/50 |

FOREIGN PATENT DOCUMENTS

| | | |
|---|---|---|
| DE | 1950879 U | 12/1966 |
| DE | 2655119 A1 | 6/1978 |
| DE | 3140143 A1 | 4/1983 |
| DE | 4000909 A1 | 8/1990 |
| DE | 10353385 A1 | 6/2005 |
| SU | 1358822 A1 | 12/1987 |
| SU | 1709948 A1 | 2/1992 |

OTHER PUBLICATIONS

European Search Report dated Jul. 6, 2009, (5 pages).
Kazakhstan Offical Action Inquiry received Jan. 13, 2011, (4 pages).

* cited by examiner

*Primary Examiner* — Thomas Will
*Assistant Examiner* — Joan D Misa
(74) *Attorney, Agent, or Firm* — Taylor IP, P.C.

(57) ABSTRACT

An agricultural harvesting machine including a frame and a threshing section supported by the frame. The threshing section includes a rotating member, a concave and a hydraulic concave support system that positions the concave proximate to the rotating member. The concave is movable in directions toward or away from the rotating member. The hydraulic concave support system includes at least one hydraulically driven element movable substantially parallel to the same directions.

18 Claims, 5 Drawing Sheets

CONCAVE SUSPENSION FOR A THRESHING SECTION IN A HARVESTING MACHINE

FIELD OF THE INVENTION

The present invention relates to a harvesting machine, and, more particularly, to a harvesting machine with a concave suspension for the threshing section.

BACKGROUND OF THE INVENTION

Harvesting systems, also known as combines include a crop gathering portion that gathers the crop material and separates it from the ground. In the threshing section the desired grain is threshed from the material gathered. The threshing system includes what are known as concaves that are positioned proximate to a moving usually somewhat cylindrical rotor. The concaves include holes through which the grain passes during the threshing session. The grain is then conveyed for further processing and temporary storage within the harvesting system.

During the harvesting operation the feed rate of crop material into the threshing section of the harvester is highly variable. This is caused both by operator selections of such things as the ground speed but also the feed variability due to variation in the crop density and presence of weeds. This variable feed rate presents a problem for the harvesting machine settings as well as the component life of the concaves and other threshing devices.

When a harvester is set up for a specific crop, that setting is fine tuned for a particular throughput of the machine. This particular throughput is selected to work best for a specific throughput of the machine. However, the actual throughputs of the machine will vary significantly from the ideal throughput. When the harvester is operating with the selected setting it is not optimized when not operating at that specific throughput for which the setting was designed. This results in less than optimum performance which is expressed in increased losses, grain damage, excess strain on the components and wear on the threshing concaves and other components therein. Further if the feed rate variation occurs at a rate faster than which the operator can react, such as slug feeding, the threshing section undergoes extreme stress. This stress leads to component failure of the mechanical systems. The mechanical components as a result are designed to take the highest possible loads even though machines will typically not see these loads under normal operation and some machines will never see these loads.

What is needed in the art is an adaptive and effective threshing system for use in a harvester.

SUMMARY OF THE INVENTION

The present invention provides a hydraulic suspension system for the concaves associated with a rotor in a threshing section of a harvester.

The invention in one form is directed to an agricultural harvesting machine including a frame and a threshing section supported by the frame. The threshing section includes a rotating member, a concave and a hydraulic concave support system that positions the concave proximate to the rotating member. The concave is movable in directions toward or away from the rotating member. The hydraulic concave support system includes at least one hydraulically driven element movable substantially parallel to the same directions.

DETAILED DESCRIPTION OF THE INVENTION

Figure 1:
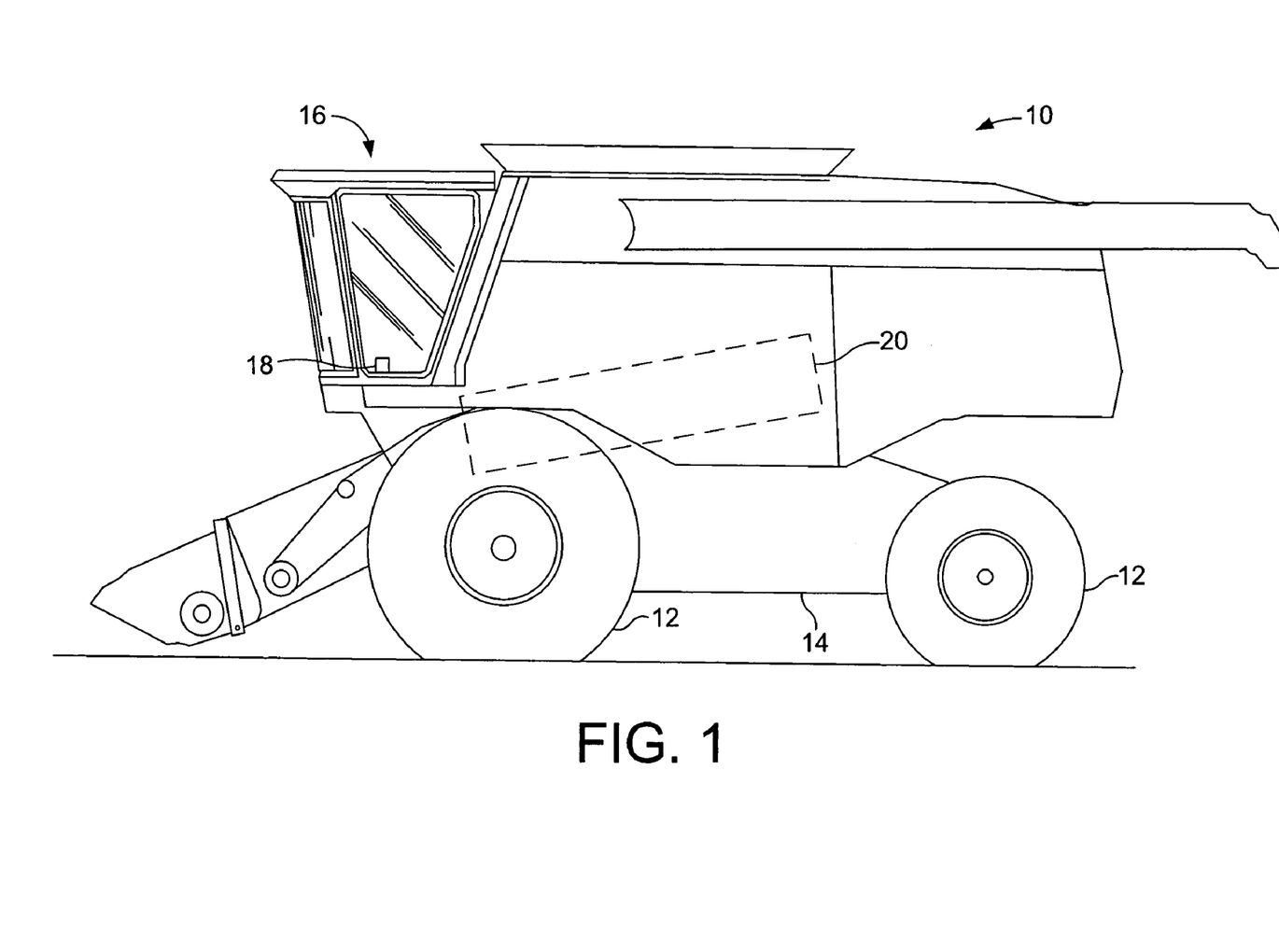
FIG. 1 is a side view of a harvesting machine utilizing an embodiment of the present invention.
Figure 2:
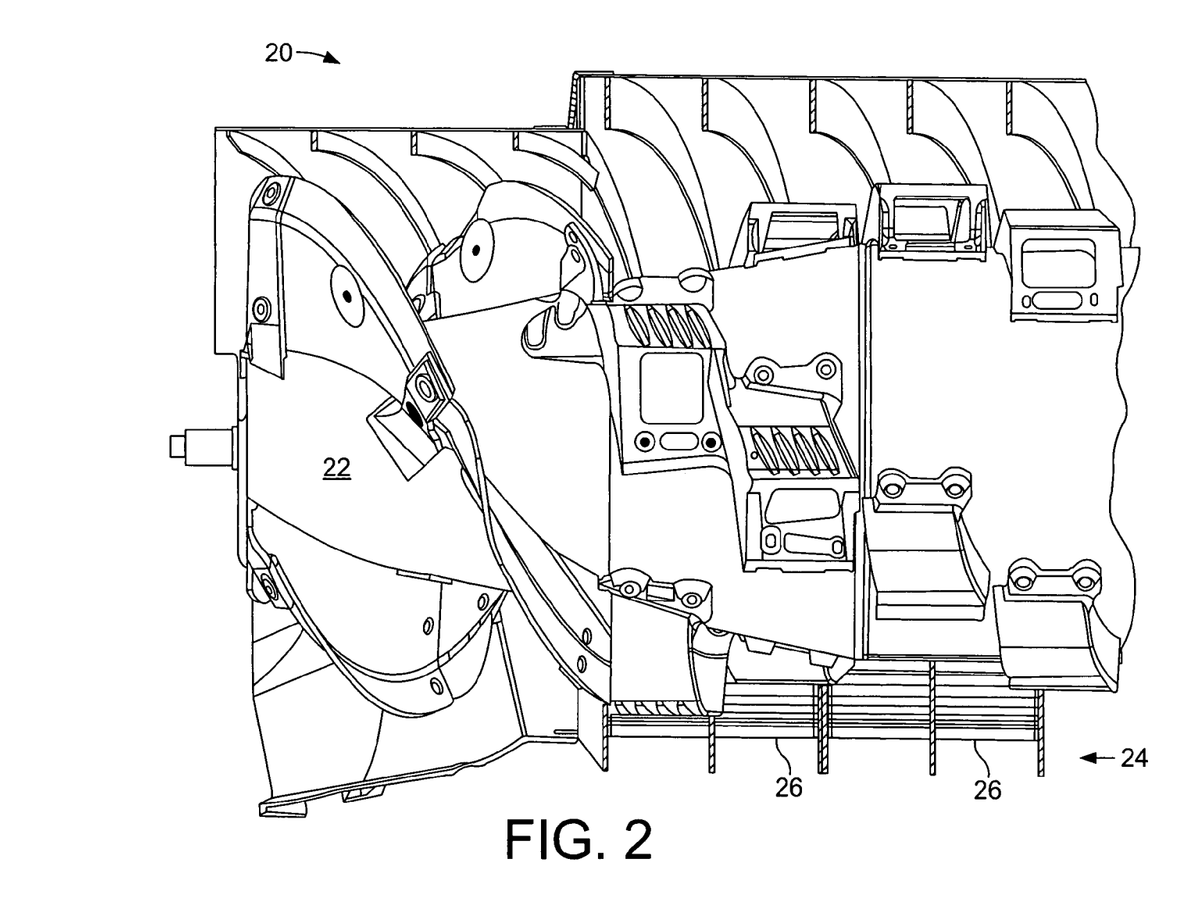
FIG. 2 is a partially sectioned side view of threshing section utilizing an embodiment of the present invention.

Referring now to the drawings, and more particularly to FIG. 1, there is shown a harvesting system 10 having wheels 12, a frame 14, a cab 16, a control system 18 and a threshing system 20. Wheels 12 are connected to frame 14 providing for movement of system 10. Frame 14 supports cab 16 and threshing system 20. Within cab 16 part of control system 18 is located including an operator interface.

Now, additionally referring to FIGS. 2-6 there is shown elements of threshing system 20. Rotor 22 also known as a rotating member 22 rotates about an axis drawing crop material thereinto and threshing it between rotor 22 and concaves 26, which are supported by hydraulic concave support system 24. Hydraulic concave support system 24 includes hanger pipes 28 also known as support bars 28, guides 30, stop bolts 32, position sensors 34 and hydraulic cylinders 36. For ease of illustration rotating member 22 has been drawn as a rotor 22, but rotating member 22 may also be understood to include a cylinder in a cylinder threshing system. Concaves 26 move in a direction substantially toward or away from rotor 22 as constrained by guides 30. At least one portion, either the ram/piston or the body of hydraulic cylinders 36 travel in the direction of travel of concave 26.

Figure 3:
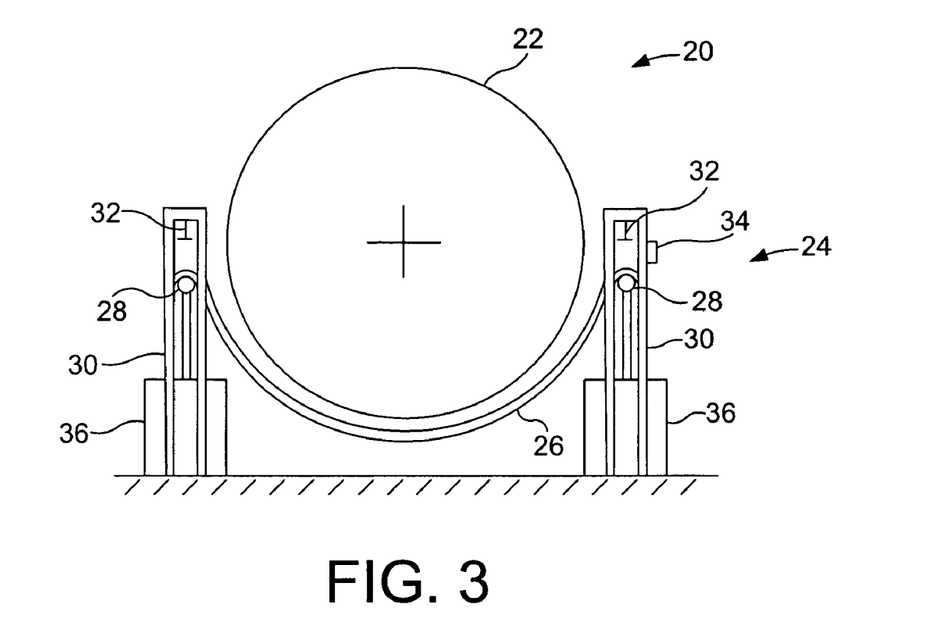
FIG. 3 is a schematicized end view of the threshing section illustrating elements of an embodiment of the hydraulic concave support system of the present invention.
Figure 5:
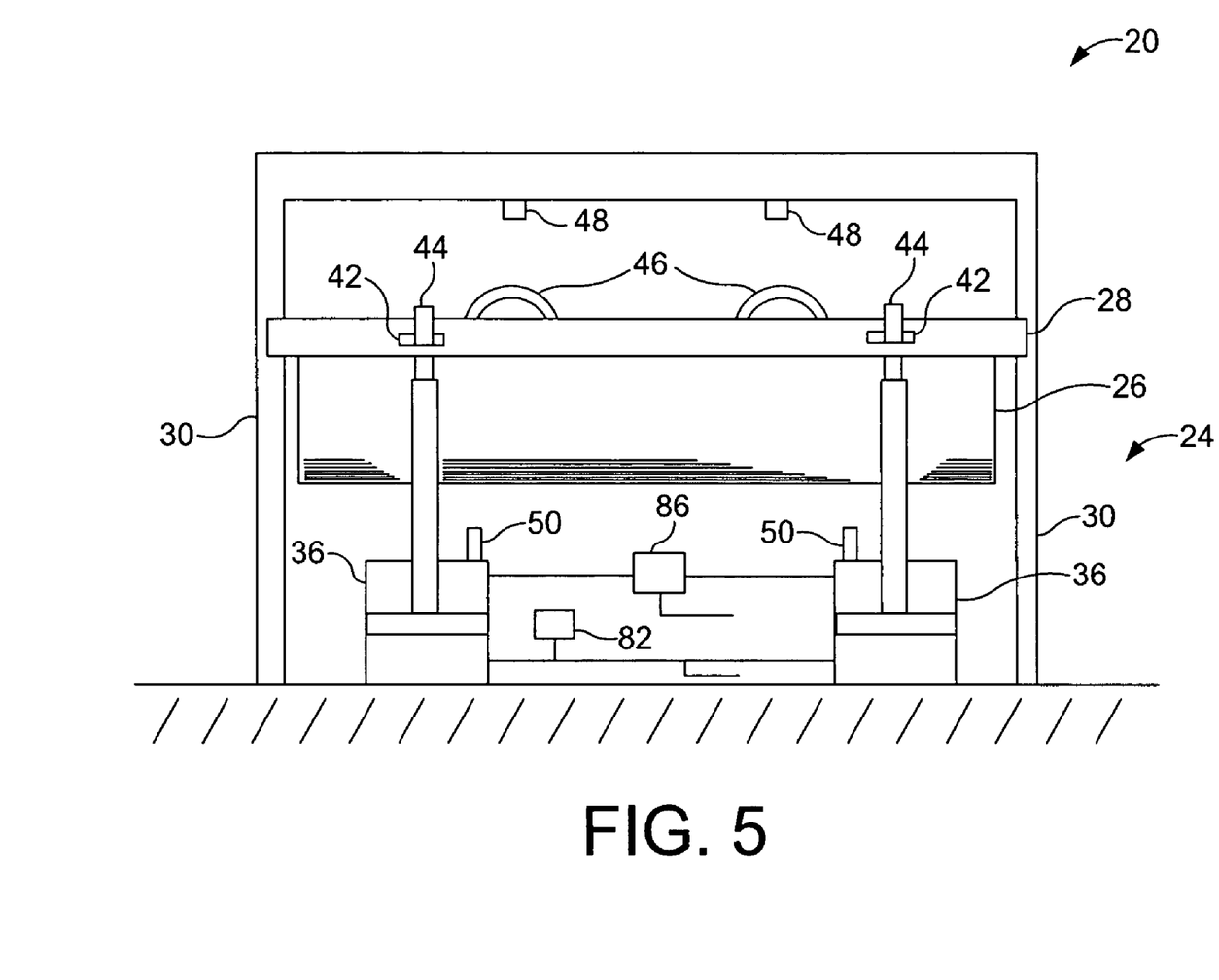
FIG. 5 is a side view of either FIG. 3 or FIG. 4.

Referring now to FIGS. 3 and 5, there is shown one embodiment of the present invention where hydraulic cylinders 36 are connected to hanger pipes 28 with at least one concave 26 positioned on hanger pipes 28. Hydraulic cylinders 36 are operatively controlled to position concaves 26 so that they are proximate to rotor 22 with the minimum of clearance even with a clearance of zero millimeters thereby coming very close to rotor 22. Hydraulic cylinders 36 control the position of concave 26 while the harvesting process is ongoing. Guides 30 are positioned so that the hanger pipes 28 traveling along a desired path. Stop bolts 32 contact hanger pipe 28 to physically stop the movement of concave 26 any further in the vertical direction. In the illustrated embodiment, hydraulic cylinders 36 are directly connected to a respective hanger pipe 28 without any linkages to change the direction of movement of the movable hydraulic element of hydraulic cylinder 36, which moves in substantially the same direction as concave 26. The functioning of the hydraulic system and how it controls the support of concave 26 will be discussed later after next considering another embodiment of hydraulic concave support system 24. As can be seen in FIGS. 3 and 5, support bars 28 travel along the path established by the shape of guides 30. The shape of guides 30 in the illustrations are substantially linear, thereby establishing a substantially linear path. The path established by guides 30 allow support bar 30, concave 26 attached thereto, and the end of hydraulic cylinder 36 attached to support bar 30 to slide in the direction established by the path of guides 30.

Figure 4:
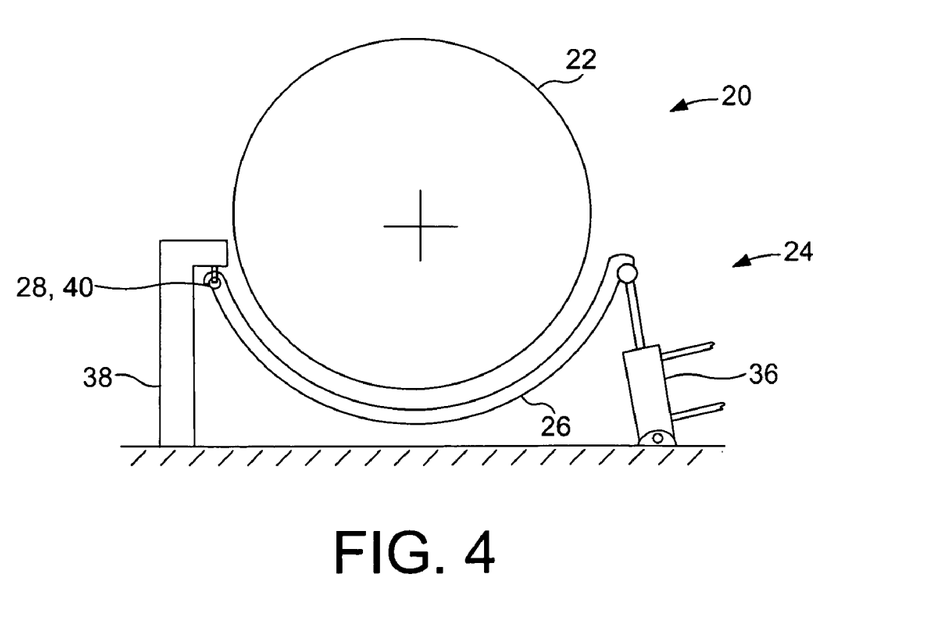
FIG. 4 is another end view of another embodiment of the hydraulic concave support system of the present invention.

Now referring to FIGS. 4 and 5 there is shown another embodiment of the hydraulic concave support system 24 having a support 38 with a pivot point 40 and a hydraulic cylinder 36. In FIG. 4 one hydraulic cylinder may be utilized which may be centrally located along hanger pipe 28. However, it is also contemplated to use two hydraulic cylinders as illustrated in FIG. 5 along one side of rotor 22. Although hydraulic concave support system 24 is illustrated and described as supporting concave 26 from beneath concave 26, it is also contemplated that the present invention can be embodied as a suspension system with concave 26 being suspended from hydraulic cylinders 36 that are suspended from a support positioned above concave 26.

In FIG. 5 there are shown further details including locating features 44 that extend from a part of hydraulic cylinders 36 and extend through openings 42 in hanger pipe 28. Cam lock pins 46 extend through concave 26 in such a manner that when concave 26 is inserted, while hydraulic cylinders 36 are fully contracted, the cam lock pins 46 extend upward and when the operator commands the extension of hydraulic cylinders 36 the cam lock pins 46 contact lock protrusions 48 causing the cam lock pins 46 to rotate into the position shown in FIG. 5 where two portions of cam lock pins 46 extend into and through openings in concave 26. When it is time to change concaves 26 the operator causes hydraulic cylinders 36 to fully contract causing unlock protrusions 50 to extend through holes in hanger pipe 28 thereby pushing cam lock pins 46 into an unlocked position for easy removal of concaves 26 from threshing system 20.

Figure 6:
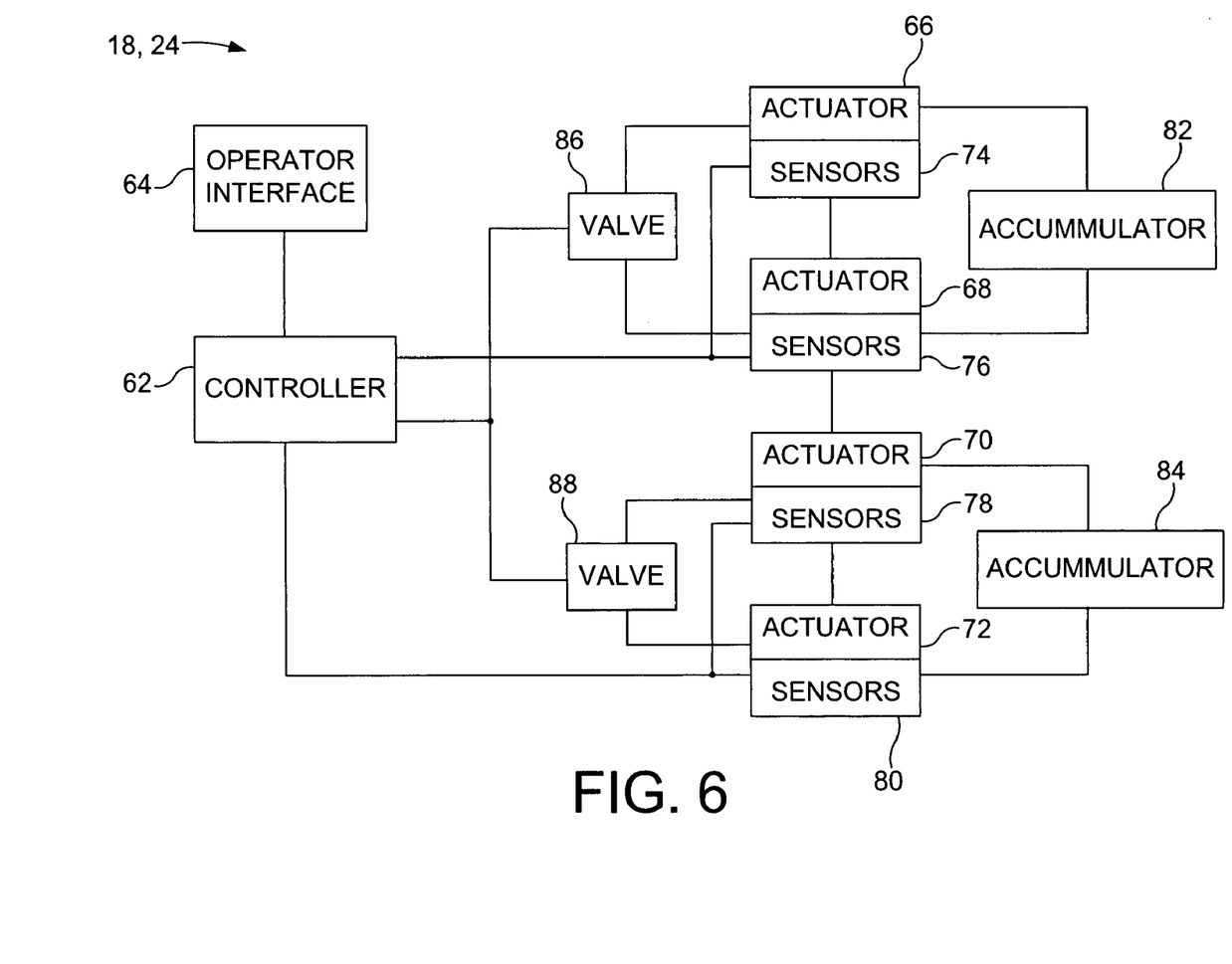
FIG. 6 is a schematical block diagram illustrating some of the control elements of the hydraulic concave support system of FIGS. 1-5.

Now, additionally referring to FIG. 6 there are shown schematically some of the elements of hydraulic concave support system 24 including a controller 62, an operator interface 64, actuators 66, 68, 70 and 72, sensors 74, 76, 78 and 80, accumulators 82 and 84, and valves 86 and 88. Actuators 66, 68, 70 and 72 are individually identified hydraulic cylinders 36 that are identified as such for the ease of discussion. Operator interface 64 is located in cab 16 and allows the operator to provide input into the positioning and setup of hydraulic concave support system 24. Controller 62 receives position and pressure information from sensors 74, 76, 78 and 80 to operatively control hydraulic concave support system 24. Accumulators 82 and 84 are positioned to absorb certain pressure and fluid imbalances in the system. Accumulators 82 and 84 are hydraulically connected on the non-shaft side of hydraulic cylinders 36 as illustrated in FIG. 5. Valves 84 and 86 are positioned on the shaft side in order to control the rate at which concave 26 approaches rotor 22. Although accumulator 82 and valve 86 are shown along a side of concave 26 in FIG. 5 it is also contemplated to utilize this configuration with the hydraulic cylinders that are across from each other as shown in FIG. 3.

While sensor, 74, 76, 78 and 80 may include both pressure and positional outputs to controller 62 and may be integral with the respective actuator, it is also contemplated that the sensors may not be integral with the actuators. For example, there may be one positional sensor associated with a hanger pipe 28 or one actuator. Also, one pressure sensor per hydraulic circuit, apart from the actuators, is also contemplated.

As the crop material enters into threshing system 20 hydraulic concave support system 24 functions to keep a substantially constant pressure on concaves 26 as concave 26 may vary in position from rotor 22 depending upon the bulk of the material passing therethrough. If concave 26 departs from rotor 22 more than a predetermined amount then hydraulic concave support system 24 increases the pressure to maintain the spacing so that it does not exceed the predetermined departure from rotor 22. However, if the pressure measured by sensors 74, 76, 78 or 80 exceed a predetermined value then controller 62 allows hydraulic cylinders 36 to move concave 26 away from rotor 22 until the material causing the significant pressure is moved through threshing system 20. Valves 86 and 88 control the rate at which hydraulic cylinders 36 return to their desired position so that concave 26 does not come into too rapid contact with crop material or rotor 22.

Concave 26 can be supported utilizing hydraulic concave support system 24 on one side with the other side mounted to support 38 as shown in FIG. 4 or concave 26 may be hydraulically supported on both sides, as shown in FIG. 3. Hydraulic concave support system 24 utilizes multiple hydraulic cylinders 36 attached to a single hanger pipe 28 having concave 26 supported thereby. An accumulator is hydraulically connected to hydraulic cylinders 36 to maintain a pressure on the crop mat as it flows through threshing section 20. This pressure on the crop mat provides for more variability in the feeding rates as the thin mat will have substantially the same pressure as a thick mat as it flows through threshing system 20. The prior art method of adjusting the distance between the concaves and the threshing elements is not the criteria followed by hydraulic concave support system 24 which tries to maintain the concave clearance at zero millimeters. As the crop passes through threshing system 20 the departure of concave 26 from rotor 22 is adjusted by hydraulic concave support system 24 to the desired crop pressure. In the event of a concave overload hydraulic concave support system 24 drops concave 26 to allow the obstruction/slug to pass therethrough. One way of detecting the presence of a slug may be the rate of concave displacement, in which controller 62 detects the rate of change allowing for a rapid opening of concave 26 from rotor 22 to allow the obstruction to pass without damage to threshing system 20.

In another embodiment of the present invention, the operator enters a desired pressure to be maintained on the crop mat, and a minimum and maximum opening distance for the distance between concave 26 and rotor 22. These settings are crop specific and operator interface 64 may display suggested settings for a particular crop type/variety. Controller 62 positions concave 26 at the minimum opening distance, such as 5 mm, when there is no crop mat between concave 26 and rotor 22. Controller 62 monitors the separation distance as the crop mat flows between concave 26 and rotor 22 and maintains the desired pressure as long as the separation distance remains between the minimum and maximum opening distance. If the maximum opening distance, such as 15 mm, is approached or violated, then controller 62 increases the pressure to maintain the separation distance so as to not exceed the maximum opening distance, even if the pressure exceeds the selected pressure. However, if a blockage or slug enters between concave 26 and rotor 22, controller 26 detects this and rapidly moves concave 26 away from rotor 22 to allow the blockage/slug to pass. The detection of the blockage/slug is accomplished by detecting a high rate of change in the separation distance and/or by a rapid pressure increase and/or exceeding a predetermined pressure sensed by at least one of the sensors 74, 76, 78 or 80. Once the blockage/slug has passed, controller 62 moves concave 26 back to its normal operating position between the minimum and maximum opening distance.

Applicants also contemplate the use of a predetermined pressure profile or use of an algorithm to modify the pressure applied to concave 26 while it is between the minimum and maximum opening distance.

Operator interface 64 allows the operator to advantageously cam lock and unlock concave 26 when it is time to change out concave 26. Operator interface 64 additionally allows the desired pressure to be set by the operator while hydraulic concave support system 24 does attempt to maintain the concave clearance at zero rather than a preset separation as in the prior art.

The present invention advantageously reduces crop loads on the threshing system and the concave support structure as well as provides for better serviceability and more crop throughput while keeping crop losses to a minimum. The reduced loading in the system is beneficial in that some structural members can be reduced in size and weight to provide an overall improvement in the efficiency of the system. The single point release utilizing the cam lock system can be advantageously operated from the cab and reduces the changeover time when concaves have to be replaced or are changed to accommodate a different crop. Another advantage of the present invention is that the harvester is able to match the changing conditions without operator input and is able to provide a more uniform loss curve while varying the feed rates therethrough. Yet a further advantage of the present invention is that it reduces concave wear that can be brought on by incorrect operator settings of a concave clearance.

Having described the preferred embodiment, it will become apparent that various modifications can be made without departing from the scope of the invention as defined in the accompanying claims.

The invention claimed is:

1. An agricultural harvesting machine, comprising:
 a frame; and
 a threshing section supported by said frame, said threshing section including:
  a rotating member;
  at least one concave movable in directions toward and away from said rotating member;
  a hydraulic concave support system positioning said at least one concave proximate to said rotating member, said hydraulic concave support system including at least one hydraulically driven element movable substantially parallel to said directions toward and away from said rotating member;
  at least one hydraulic actuator including a first hydraulic actuator having an end portion, said end portion being said hydraulically driven element;
  a support bar connected to said end portion, said support bar engaging an end of said concave, said support bar having a first end and a second end;
  a plurality of guides including a first guide and a second guide, said first end of said support bar sliding along said first guide, said second end of said support bar sliding along said second guide when said hydraulically driven element moves said support bar along a substantially linear path; and
  a controller operatively connected to said at least one hydraulic actuator, said controller being configured to maintain a substantially constant pressure on crop material passing between said concave and said rotating member based on a user input related to a selected pressure on the crop.

2. The agricultural harvesting machine of claim 1, wherein said at least one hydraulic actuator additionally includes a second hydraulic actuator having an end portion, said support bar being additionally connected to said end portion of said second hydraulic actuator.

3. The agricultural harvesting machine of claim 1, further comprising an other support bar engaging an opposite end of said concave, said at least one hydraulic actuator additionally including a second hydraulic actuator having an end portion, said other support bar being connected to said end portion of said second hydraulic actuator.

4. The agricultural harvesting machine of claim 3, wherein said at least one hydraulic actuator additionally includes a third hydraulic actuator and a fourth hydraulic actuator both having an end portion, said support bar being additionally connected to said end portion of said third hydraulic actuator, said other support bar being additionally connected to said end portion of said fourth hydraulic actuator.

5. The agricultural harvesting machine of claim 4, further comprising a hydraulic accumulator hydraulically connected to said first hydraulic actuator and to said second hydraulic actuator.

6. The agricultural harvesting machine of claim 5, wherein said controller is further configured to detect a rate of change of a separation distance between said rotating member and said at least one concave, said controller being operatively connected to said first hydraulic actuator and to said second hydraulic actuator.

7. The agricultural harvesting machine of claim 1, wherein said plurality of guides each establish said substantially linear path that said support bar follows.

8. The agricultural harvesting machine of claim 1, wherein said controller maintains said substantially constant pressure between a minimum and a maximum distance of said concave from said rotating member.

9. The agricultural harvesting machine of claim 8, wherein said controller increases the pressure on the crop material when the distance of said concave from said rotating member exceeds said maximum distance.

10. The agricultural harvesting machine of claim 9, wherein said controller is configured to allow said concave to depart from said rotating member a distance further than a selected departure distance if said pressure is above a predetermined value.

11. A threshing section for use in an agricultural harvesting machine, the threshing section comprising:
 a rotating member;
 at least one concave movable in directions toward and away from said rotating member;
 a hydraulic concave support system positioning said at least one concave proximate to said rotating member, said hydraulic concave support system including at least one hydraulically driven element movable substantially parallel to said directions toward and away from said rotating member;
 at least one hydraulic actuator including a first hydraulic actuator having an end portion, said end portion being said hydraulically driven element;
 a support bar connected to said end portion, said support bar engaging an end of said concave, said support bar having a first end and a second end;
 a plurality of guides including a first guide and a second guide, said first end of said support bar sliding along said first guide, said second end of said support bar sliding along said second guide when said hydraulically driven element moves said support bar along a substantially linear path; and
 a controller operatively connected to said at least one hydraulic actuator, said controller being configured to maintain a substantially constant pressure on crop material passing between said at least one concave and said rotating member based on a user input related to a selected pressure on the crop.

12. The threshing section of claim 11, wherein said at least one hydraulic actuator additionally includes a second hydraulic actuator having an end portion, said support bar being additionally connected to said end portion of said second hydraulic actuator.

13. The threshing section of claim 11, further comprising an other support bar engaging an opposite end of said concave, said at least one hydraulic actuator additionally including a second hydraulic actuator having an end portion, said other support bar being connected to said end portion of said second hydraulic actuator.

14. The threshing section of claim 13, wherein said at least one hydraulic actuator additionally includes a third hydraulic actuator and a fourth hydraulic actuator both having an end portion, said support bar being additionally connected to said end portion of said third hydraulic actuator, said other support bar being additionally connected to said end portion of said fourth hydraulic actuator.

15. The threshing section of claim 14, further comprising a hydraulic accumulator hydraulically connected to said first hydraulic actuator and to said second hydraulic actuator.

16. The threshing section of claim 15, wherein said controller is configured to detect a rate of change of a separation distance between said rotating member and said at least one concave, said controller being operatively connected to said first hydraulic actuator and to said second hydraulic actuator.

17. The threshing section of claim 11, wherein said plurality of guides each establish said substantially linear path that said support bar follows.

18. The threshing section of claim 11, further comprising
at least one position sensor configured to send a signal to said controller representing a distance between said rotating member and said concave; and
at least one pressure sensor configured to send a signal to said controller representative of a pressure in said hydraulic concave support system, said controller maintaining said pressure at said substantially constant pressure unless said distance exceeds a predetermined distance.

* * * * *

UNITED STATES PATENT AND TRADEMARK OFFICE
CERTIFICATE OF CORRECTION

PATENT NO. : 8,157,629 B2
APPLICATION NO. : 12/048321
DATED : April 17, 2012
INVENTOR(S) : Yanke et al.

Page 1 of 1

It is certified that error appears in the above-identified patent and that said Letters Patent is hereby corrected as shown below:

In the Claims:

COLUMN 5
At line 56, please delete "pressure on the crop.", and substitute therefore --pressure on the crop material.--

COLUMN 6
At line 62, please delete "pressure on the crop.", and substitute therefore --pressure on the crop material.--

Signed and Sealed this
Thirtieth Day of April, 2013

Teresa Stanek Rea
*Acting Director of the United States Patent and Trademark Office*